United States Patent [19]

McMills et al.

[11] Patent Number: 4,650,228

[45] Date of Patent: Mar. 17, 1987

[54] HEAT-RECOVERABLE COUPLING ASSEMBLY

[75] Inventors: Corey J. McMills, Los Altos; Dennis C. Siden, Portola Valley, both of Calif.

[73] Assignee: Raychem Corporation, Menlo Park, Calif.

[21] Appl. No.: 807,201

[22] Filed: Dec. 10, 1985

Related U.S. Application Data

[63] Continuation of Ser. No. 531,961, Sep. 14, 1983, abandoned, which is a continuation-in-part of Ser. No. 432,200, Oct. 1, 1982, abandoned.

[51] Int. Cl.⁴ ............................................. F16L 13/14
[52] U.S. Cl. .................................. 285/381; 285/382.7; 285/909; 285/382; 174/DIG. 8; 339/DIG. 1; 156/86; 29/447
[58] Field of Search .............. 285/381, 382.7, DIG. 8, 285/DIG. 10, 382; 174/DIG. 8; 339/DIG. 1; 156/86; 264/230; 29/447

[56] References Cited

U.S. PATENT DOCUMENTS

| | | | |
|---|---|---|---|
| 2,027,962 | 1/1936 | Currie | 18/55 |
| 3,086,242 | 4/1963 | Cook et al. | 18/1 |
| 3,315,986 | 4/1967 | Quick | 285/381 |
| 3,320,355 | 5/1967 | Booker | 285/381 |
| 3,336,563 | 8/1967 | Hyslop | 336/DIG. 1 |
| 3,525,799 | 8/1970 | Ellis | 339/DIG. 1 |
| 3,538,240 | 8/1968 | Sherlock | 339/DIG. 1 |
| 3,551,882 | 12/1970 | O'Keefe | 339/177 |
| 3,708,611 | 1/1973 | Dinger | 339/DIG. 1 |
| 3,847,867 | 11/1974 | Heath et al. | 260/47 CP |
| 3,990,765 | 11/1976 | Hill | 339/177 R |
| 4,022,519 | 5/1977 | Hill | 339/DIG. 1 |
| 4,135,743 | 1/1979 | Hughes | 285/115 |
| 4,468,083 | 8/1984 | Lee et al. | 339/DIG. 1 |
| 4,469,357 | 9/1984 | Martin | 285/381 |
| 4,497,527 | 2/1985 | Cameron | 339/DIG. 1 |

FOREIGN PATENT DOCUMENTS

| | | |
|---|---|---|
| 2202580 | 8/1973 | Fed. Rep. of Germany ...... 285/381 |
| 1120131 | 7/1968 | United Kingdom . |
| 1287932 | 9/1969 | United Kingdom . |
| 1387303 | 2/1972 | United Kingdom . |
| 1383393 | 2/1972 | United Kingdom . |
| 1486207 | 10/1974 | United Kingdom . |
| 1529351 | 1/1975 | United Kingdom . |

OTHER PUBLICATIONS

IBM Technical Disclosure, R. T. Evans, "Terminal for Coaxial Cable", vol. 9, No. 3, Aug. 1966.

*Primary Examiner*—Cornelius J. Husar
*Assistant Examiner*—Eric K. Nicholson
*Attorney, Agent, or Firm*—Dennis E. Kovach; Herbert G. Burkard

[57] ABSTRACT

A heat recoverable coupling assembly for substrates having a relatively rigid outer wall, which includes a connector body and a driver member made from a band of heat recoverable material. The connector body includes a mating area for engaging a mating area on the rigid wall of the substrate. The connector body is positioned inside or outside the substrate and the driver member is positioned around the outside member. The driver member has an unrecovered transverse dimension larger than the outside member and a recovered transverse dimension smaller than the outside member. The driver member is positioned around the outside member over at least part of the mating areas. Upon heating the driver member to its recovery temperature, the driver member deforms the outside member and itself plastically deforms to a shape suitable for retaining the substrate and the connector body together. The driver member is made from heat recoverable engineering plastics.

9 Claims, 7 Drawing Figures

FIG_1

FIG_5

FIG_2

FIG_4

FIG_6

FIG_7

HEAT-RECOVERABLE COUPLING ASSEMBLY

PRIOR APPLICATION

This application is a continuation of application Ser. No. 531,961, filed Sept. 14, 1983, now abandoned, which is a continuation-in-part of Ser. No. 432,200 filed Oct. 1, 1982, now abandoned, which is incorporated herein by reference.

FIELD OF THE INVENTION

This invention relates to couplings for substrates having rigid outer walls. More particularly this invention relates to such couplings which include heat recoverable driver members.

BACKGROUND OF THE INVENTION

There is a broad range of couplings for terminating, splicing or connecting various types of substrates such as coaxial cables and pipes. However, typical couplings have proven unsatisfactory for connecting and terminating such substrates which have rigid outer walls, e.g. rigid walled coaxial cables. As referred to herein, rigid walled coaxial cables means cables having an inner conductor and an outer jacket having the mechanical properties of being substantially inflexible, stiff or hard. An example of such a cable is a CATV cable which includes a center conductor surrounded by a foam dielectric and a rigid outer shielding jacket surrounding the foam dielectric. The shielding jacket is typically made from aluminum. While rigid, the aluminum jacket has the property of being malleable.

Such cables are generally exposed to the outdoor environment. It will be appreciated that the cables including their connections and terminations are exposed to all types of weather conditions. Such conditions may include temperature changes of 55° C. or more within a twenty-four hour period. Additionally, the connections and terminations must be able to withstand water, ice, snow, extreme heat and cold and ultraviolet radiation, oxidation, pollution and salt spray.

Additionally, the tolerance limits for a given diameter cable may be quite broad. For example, cables of 0.500 inch diameter typically vary from 0.493 to 0.057. Thus, any suitable coupling must be able to accommodate such diameter differences.

One such coupling for such cables is a threaded coupling having two outer members which are threaded to one another and sealed by means of an O-ring. The coupling also includes two inside members, each having a tapered inside surface. The inside members grip the jacket deforming it to a smaller diameter such that a split ring between the inside members grips the jacket at the deformed portion. O-rings are used to seal the inside and outside members. An example of such mechanical compression connector or coupling is Blanchard U.S. Pat. No. 4,346,958.

Heat recoverable couplings for metallic tubings have previously been disclosed, for example in Hughes U.S. Pat. No. 4,135,743. Hughes discloses a coupling for metallic tubing comprising a hollow member fabricated from heat recoverable metal material and sized to recover upon heating to grip the tubing. The coupling may include a tapered portion with the wall thickness of each tapered portion decreasing away from the main body section.

Other couplings which include a heat recoverable metal driver member are described in Hill, U.S. Pat. No. 3,990,765. Hill discloses a connector for terminating the shielding of multiconductor cables. The Hill connector includes a grounding member (connector body) and a fastening means made from heat recoverable metal which is positioned inside the grounding member to grip and terminate flexible shielding braid.

Such heat recoverable metallic couplings have comparatively high compression strength and as disclosed in Hughes may include teeth which penetrate the surface of metallic tubing upon recovery. Such couplings have little transverse dimensional change, i.e. diametrical change upon recovery, generally recovery is in the range of two to five percent. Further such couplings are made from memory metal alloy including nickel titanium alloy and copper alloy. Such heat recoverable metal couplings may, upon recovery, have sufficient compression strength to cut through the rigid wall of a substrate of the type described herein. Where the wall of the substrate serves as an EMI shield, such a cut will encourage EMI leakage. Additionally, the relatively little transverse dimensional change of the heat recoverable metal couplings may prove to be unsatisfactory in accommodating the broad tolerance range of some substrates, particularly the commercially available coaxial cables described above.

Heat recoverable couplings made from polymeric material such as those disclosed in Booker, U.S. Pat. No. 3,320,355 have been disclosed for use in connecting or terminating flexible coaxial cable wires or shields, respectively. Booker discloses a sleeve of heat recoverable plastic material having a plurality of metallic clamp members disposed about the inner surface of the sleeve for receiving wires to be connected. The wires include a layer of soft dielectric. The connection is obtained by heating the sleeve and compressing the clamp members to penetrate the soft dielectric and thereby connect the wires. Booker discloses using heat shrinkable polyvinyl tubing. While the recovery force of the heat shrinkable polyvinyl sleeve may be sufficient to penetrate the soft dielectric of a cable, it would be insufficient to penetrate the surface of a rigid wall of a substrate, for example where the wall is made from aluminum or copper.

SUMMARY OF INVENTION

An object of this invention is to provide a heat-recoverable coupling assembly which is capable of being connected to an elongate substrate having a relatively rigid outer wall.

Another object of this invention is to provide a heat-recoverable coupling assembly which is capable of deforming the rigid wall of a substrate while not destroying it.

Another object of this invention is to provide a heat-recoverable coupling assembly which terminates the rigid outer jacket of coaxial cable.

In accordance with the above, the instant invention is a coupling assembly having an outside member and an inside member, comprising:

a connector body positioned inside or outside a substrate having a relatively rigid outer wall such that mating areas of the substrate and the connector body are at least in part adjacent;

a dimensionally-recoverable driver member made from a heat recoverable material having the property of plasticity, the driver member being capable of dimensional recovery from an unrecovered configuration in which the transverse dimension is greater than the outside member to a recovered configuration in which the transverse dimension is smaller than the outside member;

the driver member surrounding the outside member over at least a portion of the mating areas; such that upon heating the driver member to its recovery temperature, the driver member (a) recovers toward its recovered configuration with sufficient force to deform the outside member along at least part of the mating area and (b) plastically deforms to assume a shape on the outside member and to retain the substrate and the connector body together.

The outside member may be the connector body with the substrate positioned inside the connector body such that the respective mating areas thereof are at least in part adjacent to each other. Alternatively, the outside member may be the substrate with the connector body positioned inside the substrate. Examples of these alternative embodiments are illustrated in the drawings and specific embodiments of this specification.

Preferably, the driver member is made from a polymeric material, and especially from an engineering plastic material, which is capable of having the property of heat recoverability imparted to them. Such materials include the olefin polymers of which are preferred high density polyethylene, polypropylene, polybutene-1, poly 4-methyl pentene and fluorinated polyolefins for example, ethylene-trifluorochloroethylene copolymers, ethylenetetrafluoroethylene copolymers, and vinylidene fluoride polymers, especially polyvinylidene fluoride, and blends thereof, for example, the fluorinated olefin blends as described and claimed in British Pat. No. 1,120,131, polyesters, for example, polyethylene terephthalate, polytetramethylene terephathalate for example that treated as described in British Patent Specification No. 1,486,207, polyphenylene-oxide and -sulphide, blends of polyethylene oxide with styrene, silicone-carbonate block copolymers, polyketones, such as polyarylether ketones, for example, those described and claimed in British Pat. Nos. 1,387,303 and 1,383,393, polysulphones, for example, polyaryl sulphones, polyarylether sulphones, polyetherimides, for example those described in U.S. Pat. No. 3,847,867, polycarbonates especially those derived from bis phenol-A, polyamides, especially those described and claimed in British Pat. No. 1,287,932, epoxy resins and blends of one or more of the above mentioned polymeric materials either with each other or with other polymeric materials.

A more detailed discussion of the above materials is found in British Specification No. 1,529,351 which is incorporated herein by reference.

Driver members made of engineering plastics have the ability to deform the rigid outer wall of the substrate without destroying it and also to plastically deform to a particular shape to lock the substrate to the connector body. Additionally, engineering plastics have the ability to change greatly in transverse dimension (diameter) between their unrecovered and recovered states as will be explained more fully hereinafter. This enables the coupling in accordance with this invention to accommodate a wide tolerance range in the size of substrates.

Additionally, in some applications it is advantageous to provide the connector body with an antirotational means which prevents rotational movement of the substrate with respect to the connector body. This antirotational means may be a type which penetrates the surface of the substrate wall or may be a type which shapes the substrate wall to prevent rotational movement. Alternatively, the substrate may be provided with such antirotational means which penetrates the surface of the connector body or shapes the connector body wall to prevent rotational movement of the connector body with respect to the substrate.

There are various embodiments of the coupling assembly in accordance with this invention. One embodiment is an inside connector, wherein the connector body fits inside the substrate. Using this embodiment with a coaxial cable of the type described above requires that the dielectric be removed or cored from the cable and the connector body be fitted between the center conductor and the jacket. Another embodiment is an outside connector when used in connection with the above described coaxial cable, wherein the connector body fits over the substrate, such as at the cable jacket, and preferably includes teeth for penetrating the surface only of the substrate. In either type of embodiment, the driver member comprises a band of heat recoverable material which is positioned so as to surround the connector body/substrate combination at the mating area such that upon heating the driver member recovers and deforms the outside member.

These and other objects and advantages of the invention will be appreciated more fully hereinafter with reference to the drawing, wherein.

DESCRIPTION OF PREFERRED EMBODIMENTS

Figure 1:
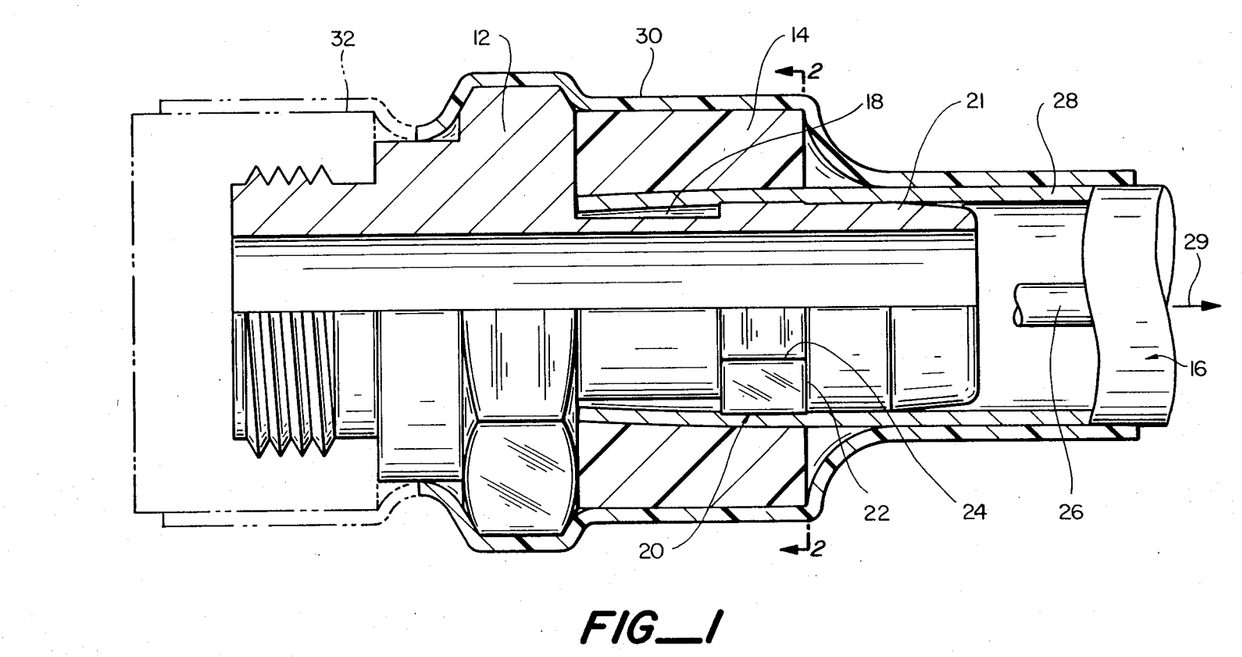
FIG. 1 is partial cross sectional view of a coupling assembly in accordance with this invention, after heat recovery.
Figure 2:
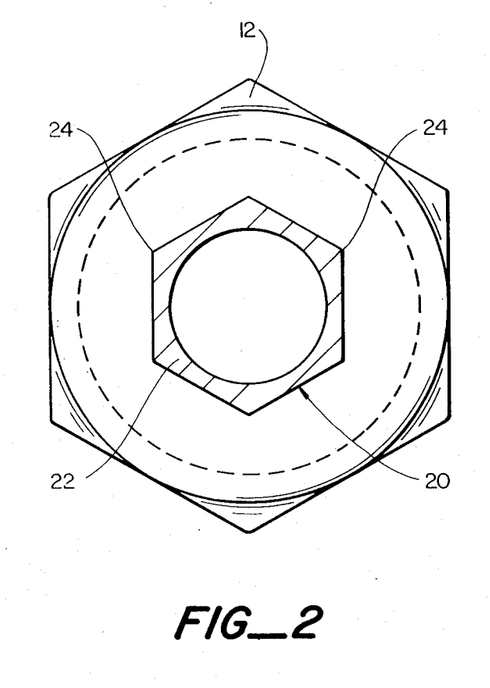
FIG. 2 is a cross sectional view of the coupling assembly of FIG. 1 without the driver member and substrate, taken along line 2—2 of FIG. 1.

With reference to the drawings, wherein like referenced characters designate like or corresponding parts throughout the several views and referring particularly to FIGS. 1 and 2, there is shown the a coupling assembly of this invention. The device includes a connector body 12 and a driver member 14. For purposes of explanation only, the rigid walled substrate chosen to be described in connection with the prefered embodiment is a coaxial cable 16. Further, for purposes of clarity, the discussion herein is generally limited to termination of the rigid jacket 28 of cable 16. In this embodiment jacket 28 is the substrate which the driver member 14 deforms against connector body 12 at the mating area 18.

The connector body 12 is generally cylindrical and hollow. The body 12 has a mating area 18 which is surrounded by jacket 28. As will be discussed more fully hereinafter, the cable's rigid jacket mates with the connector body 12 at the mating area 18 after heat recovery of the driver member 14. The mating area 18 includes an antirotational means 20 for engaging jacket 28, which only comprises a hexagonal ring 22 having six edges 24 which penetrate the surface of jacket 28. As a result of such penetration, the edges 24 serve as a means for preventing rotational movement of the cable 16 in relation to the connector body 12.

The connector body 12 also includes a cable sizing means 21. The jacket 28 of cable 16 is typically made from aluminum which, while being rigid, is malleable. The cable sizing means comprises an enlarged head with an outside diameter approximately the same as the largest anticipated inside diameter of jacket 28. When the jacket 28 of cable 16 slides over the cable sizing means 21, the jacket or cable 16 is expanded outwardly. Thus the connector body is able to accommodate a wide tolerance range of cables, while assuring good electrical and physical contact between the connector body 12 and the cable 16.

Additionally, the connector body 12 is made from the same material as the jacket 28 of the cable 16 for discouraging corrosion between the body 12 and the jacket of cable 16. In this case, the connector body 12 and the jacket 28 of cable 16 are made from aluminum. Similar materials could, of course, be used, e.g. stainless steel or copper.

The driver member 14 is the same for all of the preferred embodiments as illustrated in FIGS. 1 through 7. The driver member 14 is made from a band of heat recoverable material which is capable of dimensional change. Materials which are suitable for making the driver member include the family of materials known as engineering plastics in particular the crystalline engineering plastics such as polyamides, polyesters and polyarylether ketones. Preferred materials also include those found in British Specification 1,529,351, page 2, lines 51 through 98, as set forth previously. Most preferred materials are the polyketones of British Specification 1,387,303.

Additionally, it may be desirable to make the driver member from material which is cross linked, either by chemical means or by irradiation. These materials include certain engineering or non-engineering plastics which perform the function of the previously included materials. For a more detailed explanation of cross linking of such materials and their performance see U.S. Pat. Nos. 2,027,962 and 3,086,242, which are incorporated herein by reference.

The driver member 15 is a ring having an unrecovered transverse dimension (diameter) which is larger than the outside diameter of jacket 28 of the cable 16. Additionally, the cross section of the unrecovered ring is generally uniform. Upon warming the driver member 14 to its recovery temperature, the driver member decreases in diameter to a diameter which is smaller than the outside diameter of the jacket 28 of cable 16. The material selected recovers with sufficient force known as recovery hoop strength, to deform the rigid jacket 28 of the cable 16. Further, the material plastically deforms such that the inner portion of the driver member permanently assumes the shape of the exterior of the deformed jacket 28 in combination with the mating means 20 and the mating area 18. In general, after recovery the cross section of the driver member is non-uniform as a result of contact with and deforming of the substrate, jacket 28.

The cable 16 includes a center conductor 26, foam dielectric (not shown) surrounding the center conductor 26 and jacket 28 made of relatively rigid material which is an electrical shield. Jacket 28 is commonly made from aluminum. The cable television industry typically uses such constructions for their cables to transmit 5 watt to 10 watt signals in the 10 to 500 MHZ frequency range.

In order to terminate the shield or jacket 28 to the connector body 12, the cable 16 is cored. In other words, the dielectric is removed from between the shield 28 and the center conductor 26. The driving member 14 is slipped over the cable jacket 28. The cable jacket 28 is positioned around the connector body 12, such that it is adjacent the mating area 18 and mating means 20. Simultaneously, the center conductor is inserted through the hollow body 12. In order to complete the termination of the cable shield 28, the driver member 14 is recovered.

The driver member 14 is warmed to a temperature sufficient to begin recovery. Thereupon, the driver member 14 shrinks, decreasing its transverse dimension (diameter) until it engages the jacket 28. As recovery continues, the driver member 14 exerts a sufficient recovery hoop strength to deform the shield 28 over the mating means 20 and along the mating area 18 as shown in FIG. 1. The driver member 14 itself possesses the quality of plasticity and plastically deforms during recovery such that the inner portion assumes the shape of the exterior of the deformed jacket 28 in combination with the mating area 18 and the mating means 20. The general shape of the cross-section driver member upon recovery and plastic deformation has become wedge shaped compared with its unrecovered generally uniform cross-section.

This wedge shaped cross section is of particular importance. If an axial force pulls the cable jacket 28 in a direction away from the connector body 12, a normal force will be created against the driver member. More particularly, as the axial force is applied to cable 16, as shown by the arrow 29, the jacket 28 will attempt to disengage from the connector body 12. Since the jacket 28 has been deformed (angulated) by the driver member 14, a component of the axial force will be resolved against and normal to the driver member 14. The driver member 14 will, because of its wedge shape, exert a force equal and opposite to the normal force component against the jacket 28, thereby preventing disengagement of the cable 16 with the connector body 12.

Typically, such cable with their couplings are exposed to the outside environment. Electrical connections and terminations such as those described herein may be adversely affected by such exposure to rain, snow, heat, cold, wide temperature fluctuations, ultra violet radiation, oxidation, pollution, salt spray and the like. Hence, it is preferred in those applications to protect the above described termination by sealing. One method of sealing the termination includes surrounding the driver member 14, connector body 12 and cable 16 with a heat shrinkable polymeric sleeve 30. The sleeve 30 is recovered until the sleeve tightly grasps the cable termination and connector body 12 as shown in FIG. 1. Other materials such as use of epoxy, mastic and other materials placed in critical areas where water or the like might seep in can be used to seal the termination from the environment.

It may be desirable to connect the sleeve 30 directly to the driver member 14. Further, it may be desirable to have sleeve 30 and driver member 14 form one integral part and that integral part may desirably be an engineering plastic.

After sealing the termination in accordance with the above, the center conductor 26 may be connected to a like conductor of another cable, simply terminated or connected to some electrical component. The remaining portion of connector body 12 is adapted to permit such flexibility.

Additionally, the coupling assembly of FIG. 1 may be used as a pneumatic coupling. By closing off one end of the coupling, such as placing an end connector 32 over one end of the connector body 12, an air tight seal is created to terminate cable 16.

Another embodiment of the invention will now be described with particular reference to FIG. 3. Similar to the coupling assembly of FIG. 1, the coupling assembly of FIG. 3 includes a connector body 42, and a driver member 14 for terminating the jacket 28 of the cable 16.

Generally, the connector body 42 is the same as connector body 12 and functions in a similar manner. Body 42 includes a mating area 48 having a mating means 50 as well as a cable sizing means 51 which operates precisely the same as cable sizing means 21.

The mating means 50, however, includes a plurality of outwardly extending teeth which penetrate the surface only of jacket 28 instead of hexagonal ring 22 of FIG. 1. Upon recovery of driver member 14, the cable shield is forced into intimate contact with the teeth of mating means 50 for penetration of the surface only of jacket 28. The mating means 50 comprises a raised ring which leaves a flat area 52 between sizing means 51 and mating means 50. As recovery continues, the driver member 14 deforms the jacket 28 such that it contacts the flat area 52. Upon recovery, the driver member 14 has once again plastically deformed with a non-uniform cross section defining a wedge shape.

Figure 3:
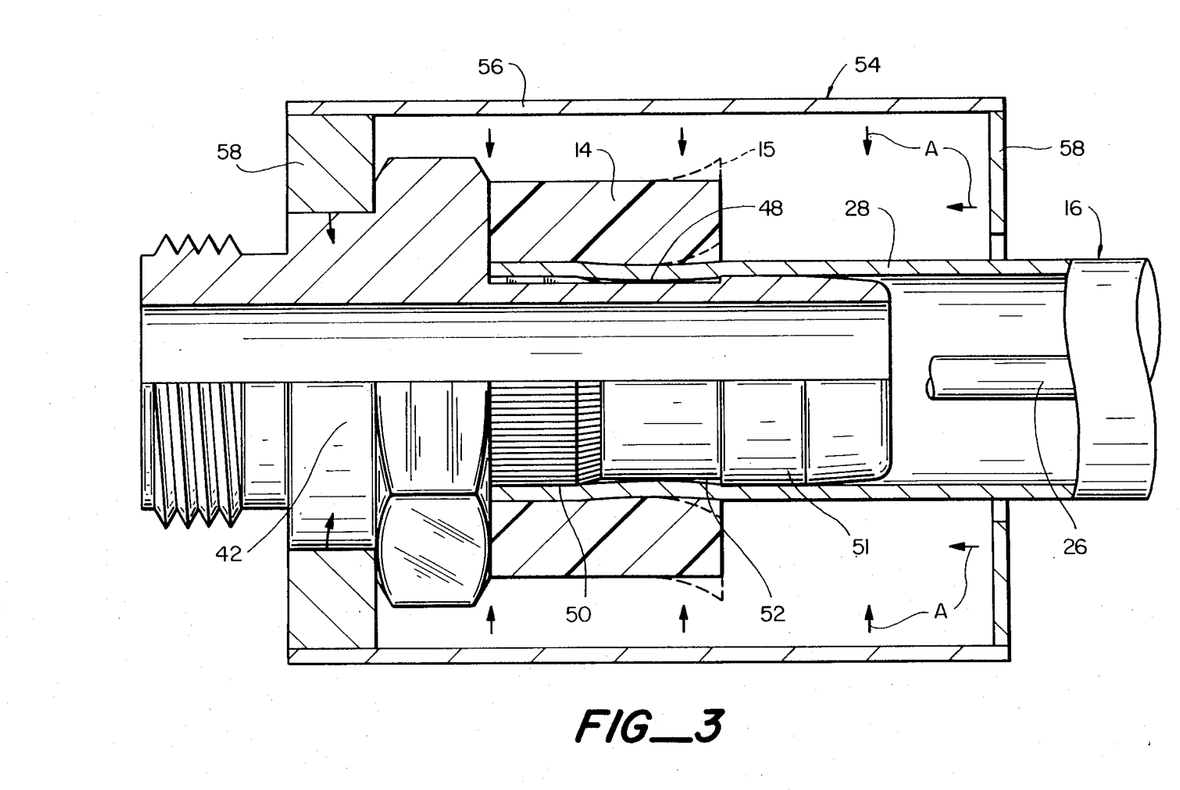
FIG. 3 is a partial cross sectional view of another embodiment of a coupling assembly in accordance with this invention.

Basically, the embodiments of FIGS. 1 and 2 and 3 function similarly. However, the hexagonal ring mating means 20 has been replaced by the raised ring of the mating means 50. Additionally, the jacket 28 is deformed between two raised surfaces, namely the sizing means 51 and the mating means 50 of the embodiment of FIG. 3, instead of along the hexagonal ring 22 as in the embodiment of FIGS. 1 and 2. Additionally, the teeth of means 50 have replaced hexagonal edges 24 and, similarly, the teeth 50 provide a means for discouraging rotation between the connector body 42 and the cable 16.

In the embodiment of FIG. 3, as in all the embodiments of this invention, it is desirable to have uniform heating of the heat recoverable driver member 14. FIG. 3 illustrates a structure for accomplishing same.

As shown in FIG. 3, the connector body 42 includes uniform heating means 54, which comprises a hood 56 having downwardly extending arms 58. Heat is applied to the exterior of the means 54 by torch or the like. Alternatively, the hood may be made from conductive material and an electrical heat source may be provided to heat conductor body 42 and in turn means 54. In either alternative, the driver member 14 is warmed until it recovers by convection and conduction. Heat applied to means 54 warms driver member 14 through convection as illustrated by arrows A. Heat is also applied to driver member 14 by conduction as it travels through the connector body 42 and more directly through conduction through the jacket 28. Such warming of both the inside and the outside of the driver member 14 provides more uniform heating thereof and allows the inside and outside to recover at the same time thereby promoting uniform recovery of the driver member 14.

It may be desirable to make the inside portion of driver member 14 flow during recovery. Thus, if the cable 16 should pull away slightly from the connector body 12, the flowed portion of driver member 14 will act as a means to seal the gap between the body 12 and cable 16. Additionally, such flowing of the driver member 14 serves as a means for indicating sufficient recovery of driver member 14. Such flowing of the driver member 14 may be accomplished by means of inside heating as described above.

Figure 4:
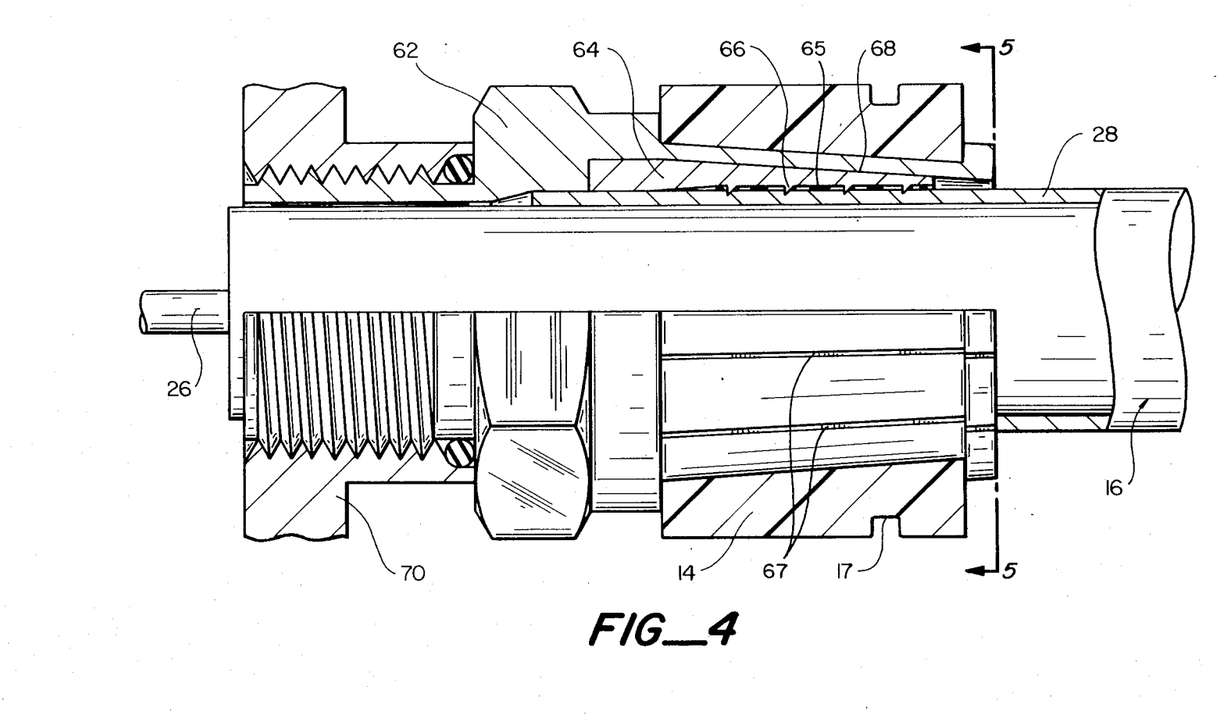
FIG. 4 is a partial cross sectional view of yet another embodiment of a coupling assembly in accordance with this invention.

In the preferred embodiments shown in FIGS. 3 and 4, the coupling includes means for visually determining recovery of the driver member. In the embodiment illustrated in FIG. 3, the means comprises the driver member 14 having a flared end zone 15. The end zone 15 is flared away from contact with the cable 16 and connector body 12. As heat is applied to the connector body 12 or the cable jacket 28, the driver member is heated by conduction and subsequently recovers, as described above. The end zone 15 flared away from the connector body 12 and jacket 28 does not get the benefit of such conductive heating. End zone 15 relies solely on convective heating, as described above, to achieve a temperature sufficient for recovery. Hence end zone 15 will recover after the remaining portion of driver member 14. It will be appreciated that a field technician or the like can visually observe when the end zone 15 has recovered, since it will no longer be flared.

Another embodiment of the means for visually determining recovery of the driver member comprises notching the driver so that an annular groove 17 appears in the driver member 14, after recovery, as shown in FIG. 4. Prior to recovery the flared portion obscures the groove 17 and after recovery, the groove becomes visible.

Figure 5:
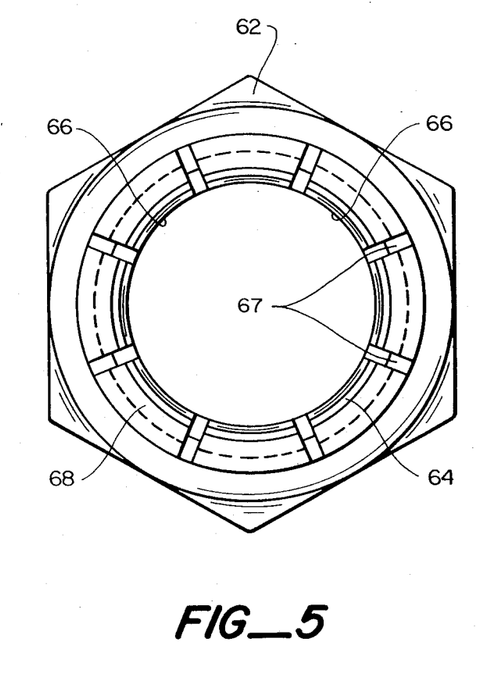
FIG. 5 is a cross sectional view of a coupling assembly of FIG. 4 without the driver member and substrate taken along line 5—5 of FIG. 4.

FIGS. 4 and 5 illustrate yet another embodiment of the coupling assembly in accordance with this invention. Similar to the previously described embodiments, the embodiment illustrated in FIGS. 4 and 5 includes a connector body 62, the heat recoverable driver member 14 and a mating means 64 for terminating the shield of cable 16. The connector body 62 does not include a sizing means since the body surrounds cable 16. Mating means 64 is positioned on the inside circumference of hollow connector body 62. The interior mating means 64 includes a plurality of inwardly extending teeth 66 which penetrate the surface only of jacket 28 upon recovery of the driver member 14. Additionally, the mating surface 65 includes an angulated incline surface 68 shaped such that when driver member 14 recovers it forms a wedge shape. Mating means 64 and mating surface 65 contain a number of slots 67 therein to allow deformation thereof radially to engage jacket 28 of cable 16 upon recovery of driver member 14. The teeth 66 prevent rotation and elongation of the cable 16 with respect to the connector body 62. The connector body 62 may be connected to a bulk head 70 or similar device for connecting central conductor 26 to another cable or appropriate electronics as desired. In this embodiment the cable 16 is not cored as in the previous embodiments of FIGS. 1–3. In this embodiment the driver member deforms the connector body 62 to engage the substrate, which in this embodiment is the jacket 28 of cable 16, whereas in previus embodiments of FIGS. 1–3 the substrate, jacket 28, was deformed to engage the connector body 12 or 42.

Figure 6:
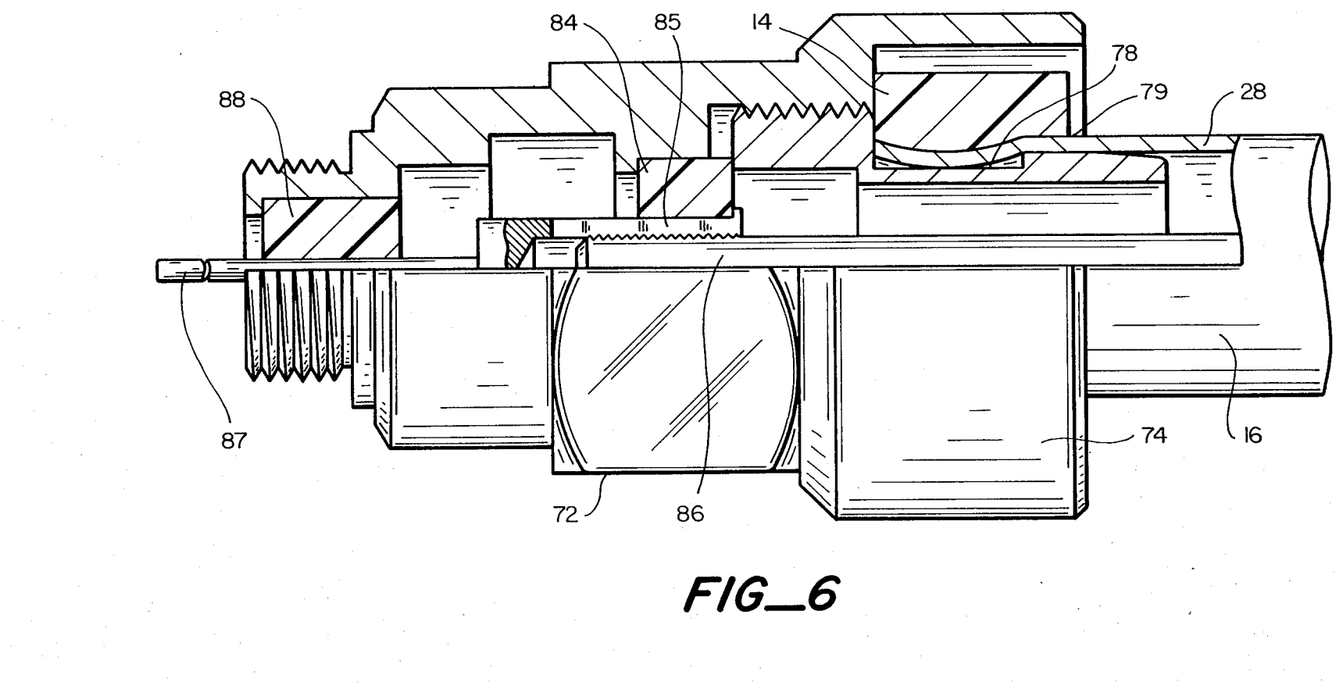
FIG. 6 is a partial cross sectional view of another embodiment of a coupling assembly in accordance with this invention in the form of a CATV pin connector.
Figure 7:
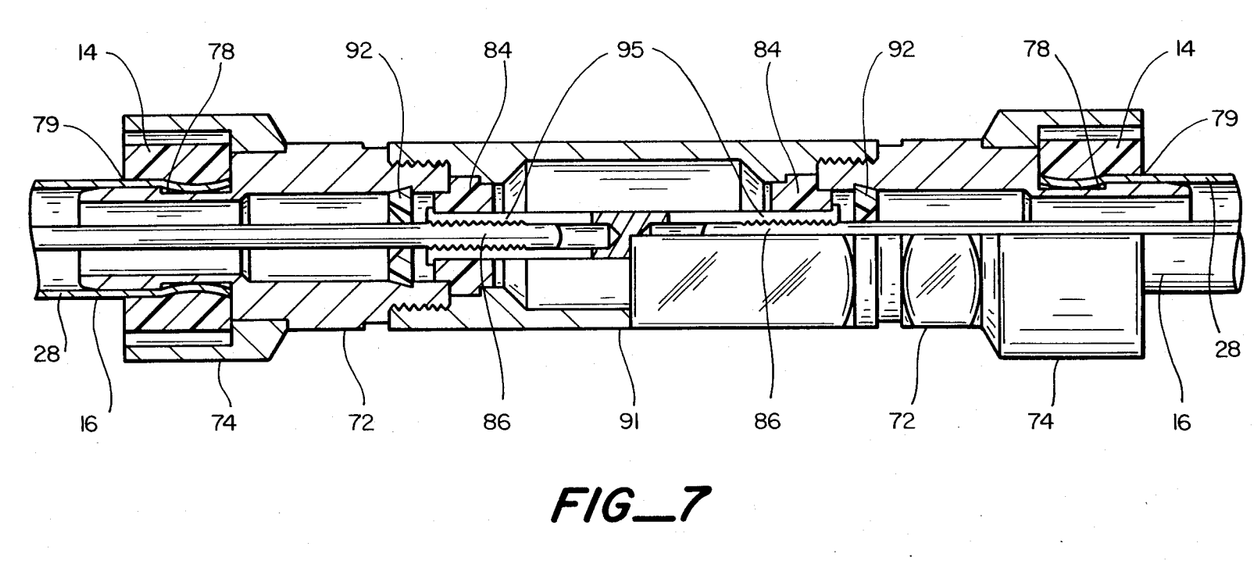
FIG. 7 is a partial cross sectional view of another embodiment of a coupling assembly in accordance with this invention in the form of a CATV cable splice connector.

FIGS. 6 and 7 illustrate additional embodiments of the coupling assembly in accordance with this invention. Similar to previously described embodiment in FIGS. 3 and 4, FIGS. 6 and 7 include connector body 72, the heat recoverable driver member 14 and mating area 78 for engaging jacket 28 of cable 16. Hood 74 in this embodiment is an integral part of connector body 72 and provides means for protecting driver member 14 from direct contact with the flame when the heat source is a torch. Hood 74 also provides means for more even heating of driver member 14 by providing convection heating through the air space between the interior of hood 74 and driver member 14. Conduction heating also occurs through jacket 28. In this embodiment, hood 74 is not enclosed and provides access for visual inspection of driver member 14 during heating. It has been found that when driver member 14 has been heated sufficiently to recover, a roll of the flowing portion of the driver member will appear at corner 79 as a visual signal that sufficient heat has been applied.

An additional feature included in the embodiments of FIGS. 6 and 7 is the use of an additional driver member 84 around the pin connector body 85 in FIG. 6 and around pin connector body 95 in FIG. 7. Pin connector bodies 85 and 95 are slotted to allow deformation thereof upon recovery of driver member 84 to engage substrate 86, which is the center conductor of cable 16. In FIG. 6 the center conductor 86 is connected through pin connector body 85 to connector pin 87 which passes through the end of connector body 72 through dielectric 88. During heating of connector body 72, hood 74 and jacket 28 to recover driver member 14, driver member 84 is simultaneously recovered through conduction and convection heating. In this embodiment the connector body assembly of this invention simultaneously connects jacket 28 of cable 16 to connector body 72 and center conductor 86 to the pin connector 85. As in the other embodiments of this invention, when driver member 84 recovers it deforms pin connector body 85 to permanently engage center conductor 86 and driver member 84 plastically deforms and permanently assumes the shape of the exterior of the deformed pin connector body 85. Pin connector body 85 has teeth on the mating area made by a thread tap which engages and penetrates the surface of center conductor 86.

The connectors of FIGS. 1, 3 and 4 are generally known in the art as "feed-thru connectors." The embodiment shown in FIG. 6 is known in the art as a "pin connector." The embodiment shown in FIG. 7 is commonly known in the art as a "splice connector."

In the embodiment of FIG. 7 driver members 14 and 84 function the same as in FIG. 6 except that driver member 84 deforms the splice connector body 95 to engage center conductor 86. Splice connector body 95 has teeth on the mating surface similar to splice connector body 85. Connector body 72 is assembled with splice sleeve 91 which in turn is connected to a second connector body 72. Splice connector body 95 has an opposite end which likewise deforms and grips the center conductor 86 of cable 16 entering the opposite end of the splice connector of FIG. 7. One additional element which the splice connector of FIG. 7 contains which is not included in the other embodiments of FIGS. 1 through 6 is guide 92 which is made of a dielectric material and is positioned such that when center conductor 86 is inserted in the connector body 72, it passes through a conical hole in the center of the guide 92 whereby guide 92 then holds center conductor 86 in fixed centered position to assure proper insertion of center conductor 86 into splice connector body 95 when connector body 72 containing cable 16 is assembled with splice sleeve 91 or when cable 16 is inserted into connector body 72 which is already assembled with splice sleeve 91.

The invention also includes a method of obtaining a coupling between an elongate substrate having a rigid wall and a coupling assembly in accordance with this invention, the steps comprising: positioning the connector body concentrically with the substrate; positioning the driver member so that it simultaneously surrounds the connector body and the substrate; and thereafter, selectively recovering the driver member such that a portion of the driver member visibly recovers after the remaining portion has already recovered.

The method may also include conductively and convectively heating that portion of the driver member which recovers initially and only convectively heating that portion of the driver member which is spaced away from the connector body and cable such that the driver member recovers subsequently.

While the instant invention has been described by reference to what is believed to be the most practical embodiments, it is understood that the invention may embody other specific forms not departing from the spirit of the invention. Particularly, the driver member has been described with reference to materials which constitute engineering plastics. It will be appreciated that other materials are also suitable but are too numerous to mention specifically here. Additionally, the description of the invention has focused upon connectors for a coaxial cable. It will be appreciated that other substrates, such as refrigerator tubing or other tubing or piping and other elongate substrates having rigid outer walls in combination with connectors therefor are contemplated within the spirit, and scope of the invention. More generally, it should be understood that there are other embodiments which possess the qualities and characteristics which would generally function in the same manner and should be considered wiithin the scope of this invention. The present embodiments therefore should be considered in all respects as illustrative and not limited to the details disclosed herein but are to be afforded the full scope of the claims, so as to embrace any and all equivalent apparatuses and articles.

What is claimed is:
1. A coupling assembly, comprising:
a connector body positioned inside a substrate outer wall such that mating areas of the substrate outer wall and the connector body are at least in part adjacent the substrate outer wall having an undeformed outside diameter; and
dimensionally-recoverable driver member made from a heat recoverable material having the property of plasticity, the driver member being capable of dimensional recovery from an unrecovered configuration in which an inside diameter thereof is greater than the undeformed outside diameter of the substrate outer wall to a recovered configuration in which the inside diameter is smaller than the undeformed outside diameter;
the driver member surrounding the substrate outer wall over at least a portion of the mating areas;

a hood for protecting the driver member from direct flame and for uniformly warming the driver member;

such that upon heating the driver member to its recovery temperature, the driver member (a) recovers toward its recovered configuration with sufficient force to deform the substrate outer wall and retains the substrate and the connector body together.

2. A coupling assembly of claim 1 wherein the connector body is disposed inside the substrate.

3. A coupling assembly of claim 1 wherein the connector body is made from the same material as the substrate.

4. A coupling assembly of claim 3 wherein the driver member is made from material selected from the group consisting of engineering plastics which are capable of having the property of heat recoverability.

5. A coupling assembly of claim 4 wherein the driver member material is capable of being cross-linked.

6. A coupling assembly of claim 5 wherein the connector body includes sizing means for adapting the connector body to substrates having a range of sizes.

7. A coupling assembly of claim 1 containing means for visibly determining recovery of the driver member.

8. A method of obtaining a coupling between a substrate having a relatively rigid wall and the coupling assembly of claim 1, the steps comprising:
   (a) positioning the connector body concentrically within the substrate;
   (b) positioning the driver member so that it simultaneously surrounds the connector body and the substrate;
   (c) positioning the hood so that it surrounds the driver member; and
   (d) thereafter, heating the hood so as to recover the driver member.

9. The method of claim 8 wherein the substrate and the connector body are capable of conductively heating the driver member.

* * * * *